Nov. 1, 1938.　　　J. J. GLAUBER　　　2,135,178
CLOSURE FOR COLLAPSIBLE TUBES
Filed June 29, 1938
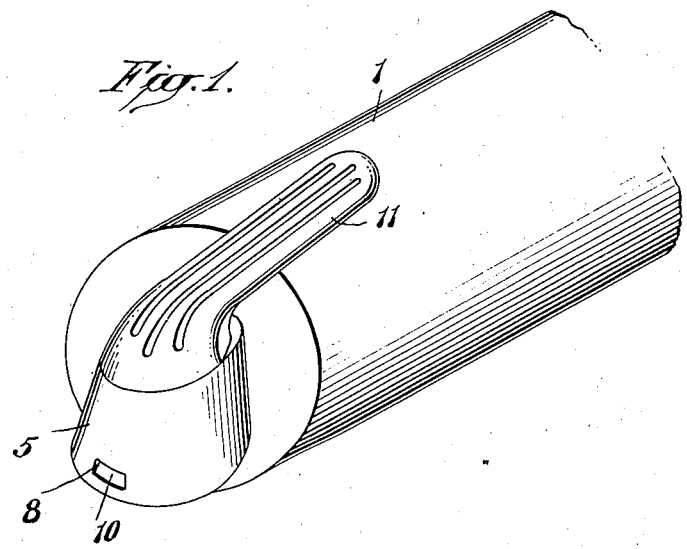
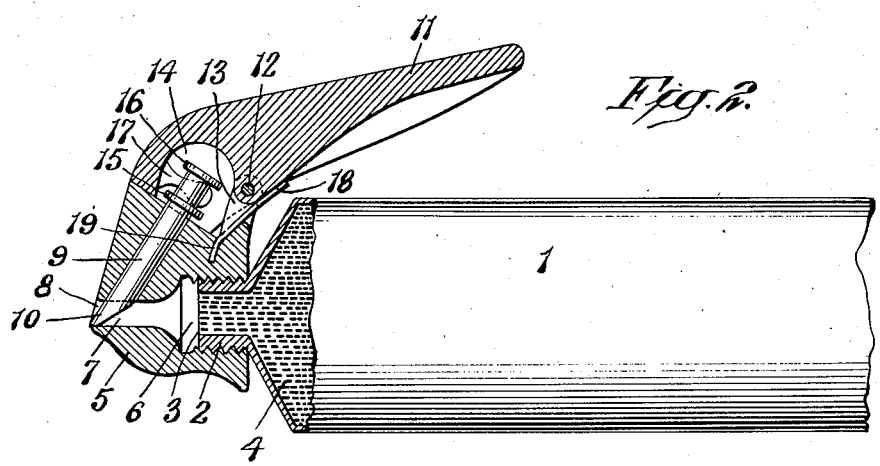
INVENTOR
John J. Glauber
BY
Harry Radzinsky
ATTORNEY Patented Nov. 1, 1938

2,135,178

UNITED STATES PATENT OFFICE 2,135,178

CLOSURE FOR COLLAPSIBLE TUBES

John J. Glauber, West Orange, N. J.

Application June 29, 1938, Serial No. 216,427

4 Claims. (Cl. 221—60)

This invention relates to closures for collapsible tubes of the character employed for containing tooth paste, shaving cream, paints and other pastelike materials. The object of the invention is to provide a closure, which is threaded on the nipple of the tube in place of the conventional cap, and which will remain in position thereon until all of the contents of the tube are depleted; which will facilitate the convenient manual ejection of the tube contents; which will prevent wastage and the accumulation of hardened paste about the ejection opening, and which will be provided with an automatically-operating closure means instantly cutting off the flow of paste when desired.

In the drawing, wherein an embodiment of the invention is shown, Fig. 1 is a perspective view of a closure made in accordance with the invention; and Fig. 2 is a longitudinal sectional view through the same.

At 1 in the drawing is shown a collapsible tube of conventional construction, the same having the usual threaded nipple 2 formed with the opening 3 through which the contents 4 of the tube are ejected by manual pressure imposed upon the walls of the tube. The improved closure means includes a body portion or housing 5 formed with an internally threaded passage 6 into which the threaded nipple 2 on the tube is received. Passage 6 is formed with a contracted portion 7 terminating in the outlet opening 8, which may be of any selected shape to thereby govern the shape of the ribbon or tube of cream or paste which emanates through it when the walls of the tube are compressed by manual pressure imposed upon them.

A plunger 9 extends diagonally through the housing 5, said plunger having a bevelled or angular end portion 10 extending into the contracted portion 7 of passage 6 and serving to normally close the outlet opening 8. The plunger is moved to open position by means of a pivoted lever 11, pivoted on the pin 12 between ears 13 formed on the housing 5. The under side of the lever 11 near one end thereof is formed with a recess 14 into which an end or head portion of the plunger is located, the portion of the plunger so located being provided with the spaced collars or flanges 15 and 16 which overlie spaced projections 17 formed on the opposite side walls of the recess 14. A flat spring 18 has one end anchored in the body of the housing, as shown at 19 and its other end bearing against the lever 11, said spring acting to normally hold the lever in the position shown in Figs. 1 and 2 wherein the plunger is acting to close the outlet opening to thereby prevent the flow of tube contents therefrom.

To eject a portion of the tube contents from the outlet opening 8 requires the usual pressure of the fingers on the walls of the tube while the thumb exerts pressure on lever 11 to cause it to withdraw the plunger to the required extent to move its end out of the passage 6, 7 and permit the free flow of tube contents out through the opening 8, the ribbon or strip of cream or paste emerging therefrom in cross-sectional shape corresponding to the shape of said opening. When pressure of the thumb on lever 11 is released, spring 18 will immediately cause the plunger and lever to be restored to the position shown in Fig. 2, wherein the outlet opening is closed by the plunger. The inclined position of the plunger and its disposition at an angle to the direction of flow of the tube contents, as well as the tapered end portion thereof serves to at once provide a sharp cut-off for the contents of the tube so that no paste adheres to or around the outlet opening in the housing 5.

What I claim is:

1. A closure for collapsible tubes comprising, a housing having a passage extending through it, said passage having an internally threaded portion for reception on the end of a collapsible tube, a lever pivoted at the side of said housing, a plunger movable in the housing at an angle to the passage, said plunger extending across the passage and closing the outer end of the same, a spring having an end anchored in the housing and a free end operative against the lever for causing the lever to hold the plunger in normally passage-closing position.

2. A closure for collapsible tubes comprising, a housing having a passage extending through it, said passage having an internally threaded portion for reception on the end of a collapsible tube, a plunger extending angularly through the housing with relation to the passage, said plunger having a tapered end extending across and normally closing one end of the passage, a lever pivoted on the housing and provided with a free end extending partly down the side of the tube to which the closure is attached, a connection between the lever and the plunger whereby the plunger is moved to open position by pressure of the lever toward the side of the tube, and spring means operative against the lever for holding the plunger in normally closed position.

3. A closure for collapsible tubes comprising, a housing having a passage extending through it, said passage having an internally threaded portion for reception on the end of a collapsible tube, a plunger located within the housing and mounted for sliding movement therein, said plunger extending angularly through the housing with respect to the passage and adapted to normally extend across the passage near the outer end of the same to close said passage, a lever pivoted on the housing, said lever having a recess within which an end of the plunger is disposed, means on the lever within said recess for engaging the end of the plunger located in the recess to thereby reciprocate the plunger in the housing, and spring means operative on the lever for causing the same to normally hold the plunger in passage-closing position.

4. A closure for collapsible tubes comprising, a housing provided with means for attaching it over the outlet opening of a tube, a passage extending through the housing and communicating with said outlet opening, a plunger extending angularly with respect to the passage and arranged to close the end of said passage, a pivoted lever for moving the plunger, and resilient means for maintaining the plunger in passage-closing position.

JOHN J. GLAUBER.